US006927841B2

(12) United States Patent
Hinojosa et al.

(10) Patent No.: US 6,927,841 B2
(45) Date of Patent: Aug. 9, 2005

(54) HOLDDOWN DEVICE FOR HARDCOPY APPARATUS

(75) Inventors: Antonio Hinojosa, Barcelona (ES); Joaquim Brugue, Barcelona (ES); Marc Jansa, Barcelona (ES); Lluis Valles, Barcelona (ES); Francesc Xavier Magrans, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 09/932,948

(22) Filed: Aug. 21, 2001

(65) Prior Publication Data

US 2002/0097311 A1 Jul. 25, 2002

(30) Foreign Application Priority Data

Aug. 24, 2000 (EP) .......................................... 00118448

(51) Int. Cl.$^{7}$ ........................ G03B 27/60; B25B 11/00; B65H 29/24; B41J 2/01

(52) U.S. Cl. .......................... 355/73; 269/21; 271/194; 347/104

(58) Field of Search ................................ 271/194, 197, 271/196; 355/73, 76, 91, 407; 347/104; 400/648; 269/21

(56) References Cited

U.S. PATENT DOCUMENTS

| | | | | | |
|---|---|---|---|---|---|
| 4,175,857 | A | * | 11/1979 | Rapp et al. | 355/73 |
| 4,447,817 | A | | 5/1984 | Naramore | 346/75 |
| 4,992,805 | A | | 2/1991 | Yoshizawa et al. | 346/134 |
| 5,124,728 | A | * | 6/1992 | Denda | 346/134 |
| 5,414,491 | A | | 5/1995 | Bryant | 355/73 |
| 5,717,446 | A | * | 2/1998 | Teumer et al. | 347/35 |
| 6,179,285 | B1 | * | 1/2001 | Teumer et al. | 271/194 |
| 6,322,265 | B1 | * | 11/2001 | Mindek et al. | 400/648 |
| 6,328,491 | B1 | * | 12/2001 | Beehler et al. | 400/648 |
| 6,336,722 | B1 | * | 1/2002 | Wotton et al. | 347/102 |
| 6,367,999 | B1 | * | 4/2002 | Juan et al. | 400/645 |
| 6,554,514 | B2 | * | 4/2003 | Wotton et al. | 400/648 |
| 6,571,702 | B2 | * | 6/2003 | Wotton et al. | 101/232 |

FOREIGN PATENT DOCUMENTS

| | | | |
|---|---|---|---|
| DE | 9211268 | 7/1993 | B43L/13/00 |
| EP | 0 409 596 | 1/1991 | B41J/3/28 |
| EP | 0997308 | 5/2000 | B41J/13/22 |
| EP | 1022147 | 7/2000 | B41J/13/14 |

OTHER PUBLICATIONS

Search Report for Corresponding European Patent Application. No. 00118448.0.

* cited by examiner

*Primary Examiner*—Alan Mathews

(57) ABSTRACT

A media holddown device a plastics vacuum guide attached to a sheet metal vacuum beam, the guide includes vacuum chambers in communication with the beam through openings to control the negative pressures applied to media of varying widths by a fan. Dividing walls are provided between the chambers to maintain the value of the negative pressure larger than a predetermined value, especially for media with conventional widths. An intermediate wall divides the guide into front and rear chambers to increase the control of media leading edges. The number, size and pattern of arrangement of openings are selected to produce desired air flow characteristics.

10 Claims, 6 Drawing Sheets

HOLDDOWN DEVICE FOR HARDCOPY APPARATUS

FIELD OF THE INVENTION

The present invention relates to a media holddown device for hardcopy apparatus such as printers, copiers, scanners and facsimile machines. In particular it relates to a suction or vacuum holddown device to maintain a media flat on a platen.

BACKGROUND OF THE INVENTION

An example of a previous apparatus comprising such a holddown device is the HP Design Jet 1000 printer, many features of which are disclosed in EP-A-0997308. The holddown device of this printer comprises a platen, a plurality of vacuum chambers for applying a negative pressure to a media positioned on the platen, a vacuum conduit connected to said vacuum chambers, and a vacuum source connected to said vacuum conduit. The vacuum chambers and the vacuum conduit are manufactured from a single piece of extruded aluminium. However, the walls between the vacuum chambers have to be added in a separate manufacturing step. Moreover, holes connecting the vacuum chambers to the vacuum conduit have to be drilled in a further manufacturing step. These additional manufacturing steps are time-consuming and add expense.

Since such printers have a relatively small number of vacuum chambers, for certain widths of media the pressure applied at the platen tends to be too low. One solution would be to raise the level of the maximum pressures in order to raise the minimum pressures too, but this requires bigger fans, or more fans, and leads to an increase in noise levels.

A further disadvantage of such printers is lack of uniformity of the pressure applied along the length of the platen. This is mainly due to the fact that by having bigger vacuum chambers only a limited number of holes can be placed along the length of the platen. In fact, having more holes may cause higher losses of pressure when loading smaller media which cannot cover all the holes in fluid communication with one vacuum chamber.

The present invention seeks to overcome one or more of the above disadvantages.

SUMMARY OF THE INVENTION

According to a first aspect of the present invention, there is provided a media holddown device comprising a platen, a plurality of vacuum chambers for applying a negative pressure to a media positioned on the platen, a vacuum conduit connected to the vacuum chambers, and a vacuum source connected to the vacuum conduit. The vacuum chambers are part of a first component and the vacuum conduit is part of a second, separate component.

The first component is preferably molded. This has the advantage that the walls between the chambers and the communication openings between the chambers and the conduit can be produced in the molding process. The first component is conveniently made of a plastics material, which has the advantage of being relatively light in weight.

The second component is preferably metallic, e.g. of sheet steel material. This has the advantage of giving structural rigidity to the hardcopy apparatus while being relatively inexpensive.

The first component may comprise two, three or more sub-components arranged along the length of a single second component.

Referring again to the HP Design Jet 1000 printer, this discloses a platen and a plurality of vacuum chambers arranged in a single row beneath the platen for applying a negative pressure to a media positioned thereon. When a media is being introduced on to the platen, the effect of the negative pressure begins to have a small influence as soon as the leading edge of the media passes over the holes in the platen nearest to the input side of the platen. However, a sufficiently high negative pressure is not applied to the media until its leading edge covers all the holes in the platen, i.e. until the media approaches the output side of the platen. This can be a considerable distance for the media not to be lying properly flat against the platen and can cause problems in print quality, especially where printing occurs right up to the edge of the media.

The present invention seeks to overcome or reduce the above problem.

According to a second aspect of the present invention, there is provided a media holddown device comprising a platen and a plurality of vacuum chambers for applying a negative pressure to a media advancing across the platen. For at least part of the length of the platen the vacuum chambers are arranged one behind the other in the direction of media advance.

An advantage of the above arrangement is that a satisfactory negative pressure is applied to the media as soon as its leading edge substantially covers all the holes through the platen which are in communication with the chambers in the first row.

A preferred embodiment has two rows of chambers, but three or more rows may be provided if desired.

Preferably, the walls separating the chambers from each other in the first row are aligned with the walls separating the chambers from each other in the second row. Openings are provided between the chambers and a vacuum conduit and in preferred embodiments the arrangement is such that the number and/or size and/or pattern of openings differ between the rows of chambers. This has the advantage that the suction effect on the media can be more precisely controlled as the media arrives at and leaves the platen.

Referring again to the HP Design Jet 1000 printer, this discloses a platen and a plurality of vacuum chambers for applying a negative pressure to a media positioned on the platen with respective walls separating adjacent pairs of chambers along the platen, the chambers being connected via respective paths to a vacuum source capable of applying a negative pressure p. In this printer the position of the walls along the platen are chosen to correspond to the conventional widths of media and, such as 36 inches and 42 inches (914 mm and 1067 mm). However, no measures are taken to prevent inefficient use of the vacuum source for all possible widths of media and in particular for small size media.

The present invention seeks to overcome the above disadvantages while ensuring that sufficient negative pressure is substantially always maintained over substantially all areas of a media positioned on the platen whatever the width of the media.

According to a third aspect of the present invention, there is provided a media holddown device comprising a platen and a plurality of vacuum chambers for applying a negative pressure to a media positioned on the platen with respective walls separating adjacent pairs of chambers along the platen, the chambers being connected via respective paths to a vacuum source capable of applying a negative pressure p. The walls are positioned so that, for substantially all widths of media extending from one end of the platen towards the other, the lowest negative pressure applied to the media does not fall below q, where q is smaller than p.

The value q preferably corresponds to a negative pressure of one inch (25.4 mm) of water. The value of p is typically two inches (50.8 mm) of water.

Preferably for selected widths of media the arrangement is such that the lowest negative pressure applied to the media does not fall below r, where r lies between q and p.

For usual media widths greater than or equal to 24 inches (610 mm) r is preferably 1.75 inches (44.5 mm) of water. For smaller usual media widths, r is preferably 1.40 inches (35.6 mm) of water.

According to a fourth aspect of the present invention, there is provided a method of determining where to locate chamber-separating dividing walls between the vacuum chambers of a media holddown device, in which the chambers and the walls are arranged along a platen, in order to ensure that a sufficient negative pressure is substantially always applied by a vacuum source to a media positioned on the platen whatever the width of the media. The chamber-separating dividing wall is located at or adjacent where the negative pressure would otherwise drop below a predetermined value q for a media having a corresponding width.

Dividing walls in a second category may additionally be provided at or adjacent to locations corresponding to conventional widths of media such as 36 inches (914 mm), 24 inches (610 mm) and A3 (297 mm). Where a dividing wall in the first category (i.e. to maintain sufficient negative pressure) would be located coincident with or close to a dividing wall in the second category, one of them may be omitted.

The component forming the vacuum chambers may be itself sub-divided into a plurality of sub-components of generally similar lengths along the platen, so that sub-component end walls are present, thus constituting a third category of wall. The ends of the sub-components may have regions where they are connected to the vacuum beam, and these regions may be separated from the rest of the sub-component by dividing walls constituting a fourth category of wall. Where a dividing wall in the first category would be located coincident with or close to a wall in the third or fourth category, the wall in the first category may be omitted.

In accordance with a fifth aspect of the present invention there is provided a method of ensuring that a sufficient negative pressure is substantially always applied by a vacuum source to a media positioned on the platen of a media holddown device whatever the width of the media. The device includes a plurality of vacuum chambers arranged along the platen and each connected via one or more respective openings to a vacuum conduit which is connected to a vacuum source. In the method, appropriately differing values are selected for the numbers, sizes and/or patterns of the openings.

It will be appreciated that the fourth and fifth aspects of the inventions may be combined.

According to a sixth aspect of the present invention, there is provided a media holddown device comprising a platen and a plurality of vacuum chambers for applying a negative pressure to a media positioned on the platen with respective walls separating adjacent pairs of chambers along the platen. The chambers are each connected via one or more respective openings to a vacuum conduit which is connected to a vacuum source. The number, size and/or pattern of said openings are different for at least some of the chambers.

Although holes are needed in the platen to provide communication with the vacuum chambers underneath, the section or diameter of these holes should be kept as small as possible, but not too small so that can be easily closed by paper wear, debris, dust, ink or the like, in order to decrease the flow of air passing therethrough when no media is covering them. Preferably the cross-section of a hole is comprised between 1 and 3 mm. With a conventional cross-sectional shape, e.g. circular, the airflow is found to produce whistling if the section is too small, e.g. 2.0 mm or less in diameter. Thus the present invention seeks to overcome or reduce the whistling noise and its impact on the user.

This aspect of the present invention is based on the realisation that, if the hole section is symmetrical, the noise (whistle) is the summation of all the different pressures created when the flow passes through the hole, whereas, with a non-symmetrical section, some of these pressures increase the noise but some of them decrease it, and the result is a whistle with lower intensity. In other words one seeks to provide a non-symmetrical airflow and this may be achieved by making the bend configuration around a hole non-symmetrical.

Thus in preferred embodiments of the present invention, the platen has holes, at least some of which have a cross-section which is asymmetrical.

In accordance with a seventh aspect of the present invention there is provided a method of manufacturing a media holddown device comprising a platen, a first component defining one or more vacuum chambers and a second component defining a vacuum conduit. The first component is first attached to the second component, a surface of the first component is then precisely machined, and the platen is then attached to the machined surface of the first component.

BRIEF DESCRIPTION OF THE DRAWINGS

Preferred embodiments of the present invention will now be described, by way of example only, with reference to the accompanying drawings, of which.

DETAILED DESCRIPTION OF PREFERRED EMBODIMENTS

Figure 11:
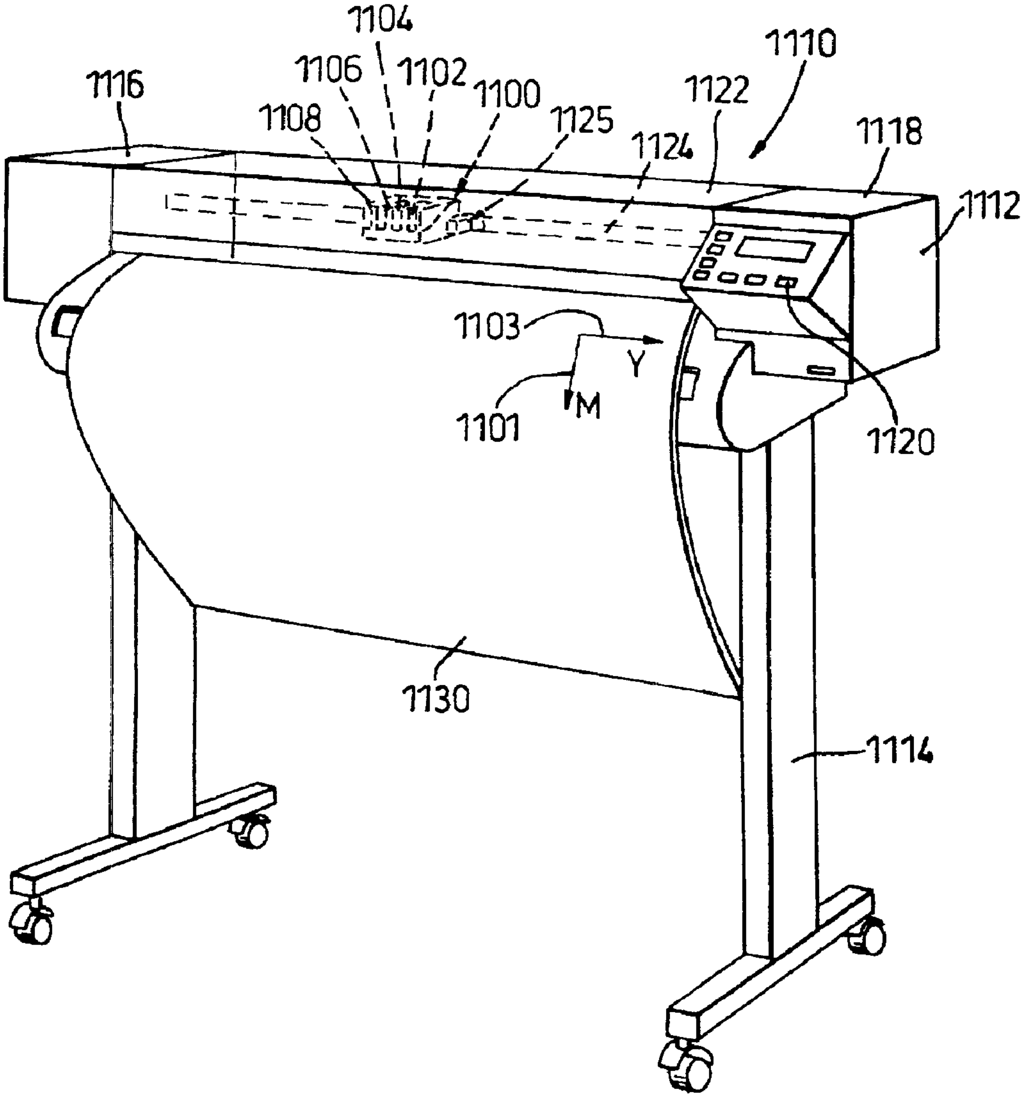
FIG. 11 is a perspective view of an inkjet printer incorporating the features of the present invention.

Referring to FIG. 11, a printer 1110 includes a housing 1112 mounted on a stand 1114. The housing has left and right drive mechanism enclosures 1116 and 1118. A control panel 1120 is mounted on the right enclosure 1118. A carriage assembly 1100 illustrated in phantom under a cover 1122, is adapted for reciprocal motion along a carriage bar 1124, also shown in phantom. The carriage assembly 1100 comprises four inkjet printheads 1102, 1104, 1106, 1108 that store ink of different colours, e.g. black, magenta, cyan and yellow ink respectively, and an optical sensor 1105. As the carriage assembly 1100 translates relative to the medium 1130 along the M and Y axis, selected nozzles of the printheads 1102, 1104, 1106, 1108 are activated and ink is applied to the medium 130. The colours from the three colour printheads are mixed to obtain any other particular colour. The position of the carriage assembly 1000 in a horizontal or carriage scan axis (Y) is determined by a carriage positioning mechanism with respect to an encoder strip. (not shown). A print medium 1130 such as paper is positioned along a vertical or media axis (M) by a media axis mechanism (not shown). As used herein, the media axis is called the M axis denoted as 1101, and the scan axis is called the Y axis denoted as 1103.

Figure 1:
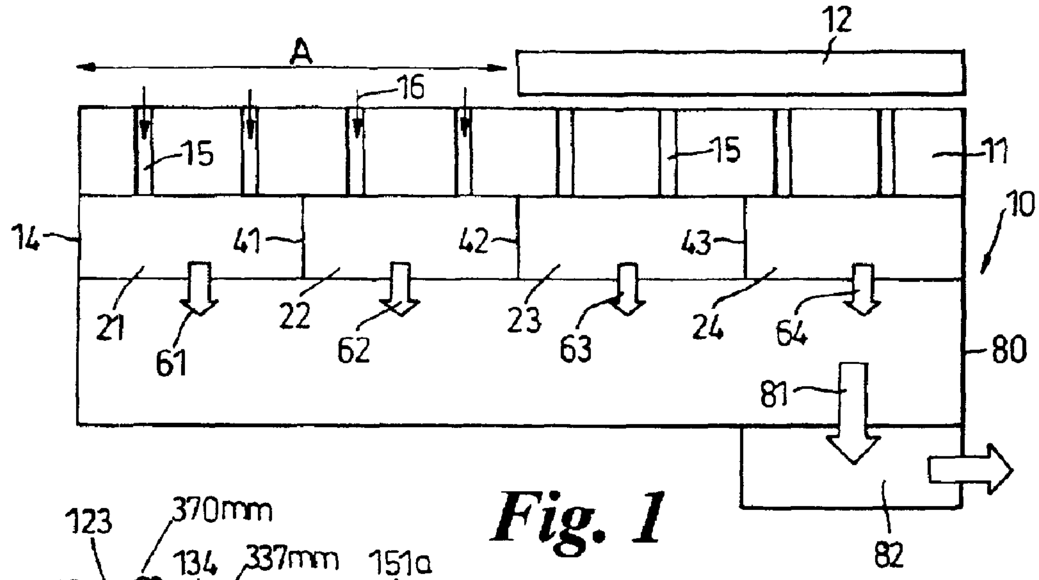
FIG. 1 is a schematic sectional view of a media holddown device in accordance with the present invention.

FIG. 1 shows a schematic sectional view of a media holddown device 10 of a printer in accordance with the present invention. The various parts of the device are not shown to scale. The device comprises a platen 11 having holes 15 therethrough so that suction can be applied from below to hold a media 12 flat thereon. Constructional details of a suitable platen, and also of other components of the holddown device 10, can be found in EP-A-0997308. As shown, media 12 is narrower than the platen so that in region A the platen holes are open, whereas the holes to the right thereof in FIG. 1 are closed by the media. Thus the air-flow through the holes under region A indicated by arrows 16 is much higher than the air-flow through the holes 15 underneath the media 12.

The platen 11 is attached to the top of a hollow vacuum guide 14 of plastics material and comprising a succession of vacuum chambers 21–24, having walls 41–43 therebetween. The chambers have openings 61 to 64 in their bottom faces indicated in FIG. 1 by air-flow arrows. The plastics material of the platen 11 is preferably polycarbonate including 15% carbon fibre for structural strength and 6% PTFE for low frictional properties. The guide 14 is of the same material so as to match the properties of platen 11.

The vacuum guide 14 is attached to the top of a structural vacuum beam 80. The beam is of sheet metal e.g. aluminium and is hollow and has an opening in its bottom face indicated by an air-flow arrow 81 in communication with a fan box 82. The fan box contains a fan (not shown) which, by producing a suction effect, causes a negative pressure to be applied to the bottom of the media 12 on the platen 11. The maximum negative pressure produced by the fan is equivalent to 2 inches (50.8 mm) of water.

Figure 10:
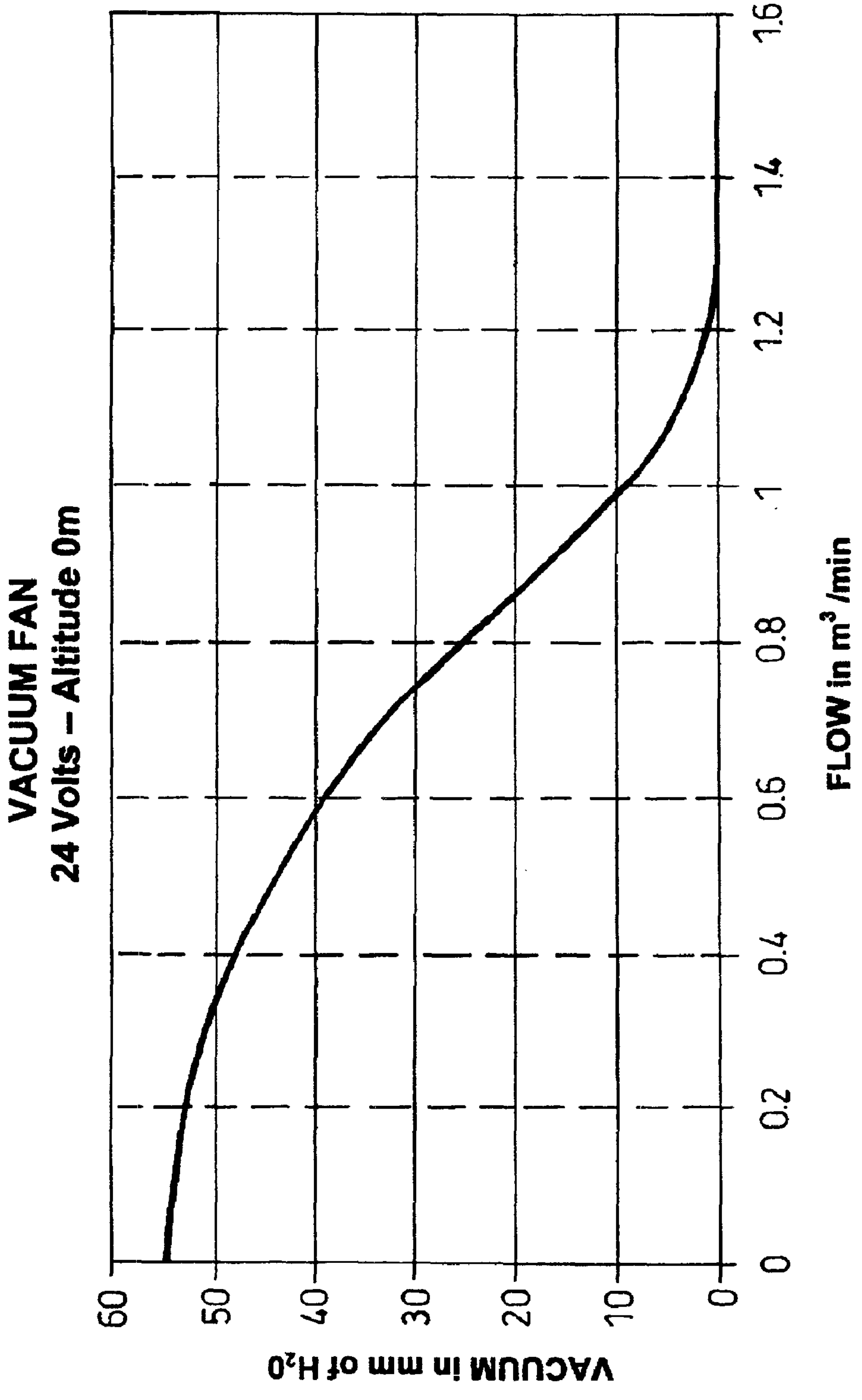
FIG. 10 is a graph of the negative pressure applied by a fan of the media holddown device against airflow.

FIG. 10 shows the typical characteristic of a printer fan showing the relationship between negative pressure and air-flow. In preferred arrangements, the air-flow rates lie between 0.3 and 0.4 $m^3$/min. Accordingly, in arrangements according to the invention, the sizes of the various openings and passages, in particular the diameters and depths of openings 61 to 64, are matched to the characteristic of FIG. 10, in particular by seeking to keep the air-flow rate below the value of 0.4 $m^3$/min, when employing the most commonly-used media for this kind of printers.

The holes 15 through the platen 11 and in communication with the top faces of chambers 21 and 22 are open so that air losses occur through openings 61 and 62 leading to increased air-flow. However, the areas of the openings 61–64 in the vacuum chambers are small compared to the area of the bottom face of each chamber 21–24 so that considerable resistance to the air flow occurs at openings 61 and 62, and an appreciable negative pressure is still applied by the fan to the media 12. Although the vacuum or negative pressure decreases as the airflow increases, the decrease is kept to a tolerable level.

Because of the need to maintain a high vacuum and a desired flow rate, arrangements according to the present invention are designed to dimension the flow limiting openings 61–64 and to position the walls 41 to 43 such that the vacuum and flow rate values keep within desired limits. With such arrangements, the aims are to have a vacuum distribution along the media which is as uniform as possible and to keep the fan power requirements as low as possible.

Figure 2:
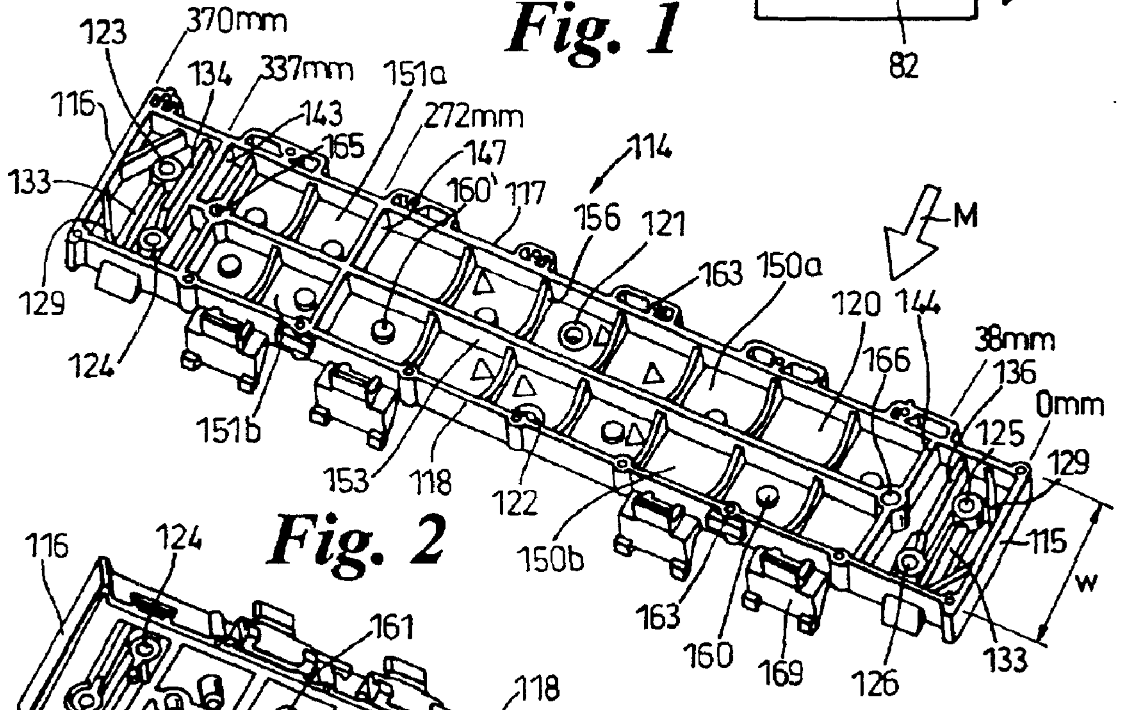
FIGS. 2 and 3 are top and bottom perspective views respectively of a sub-component of a vacuum chamber unit of a media holddown device in accordance with a first embodiment of the present invention.
Figure 3:
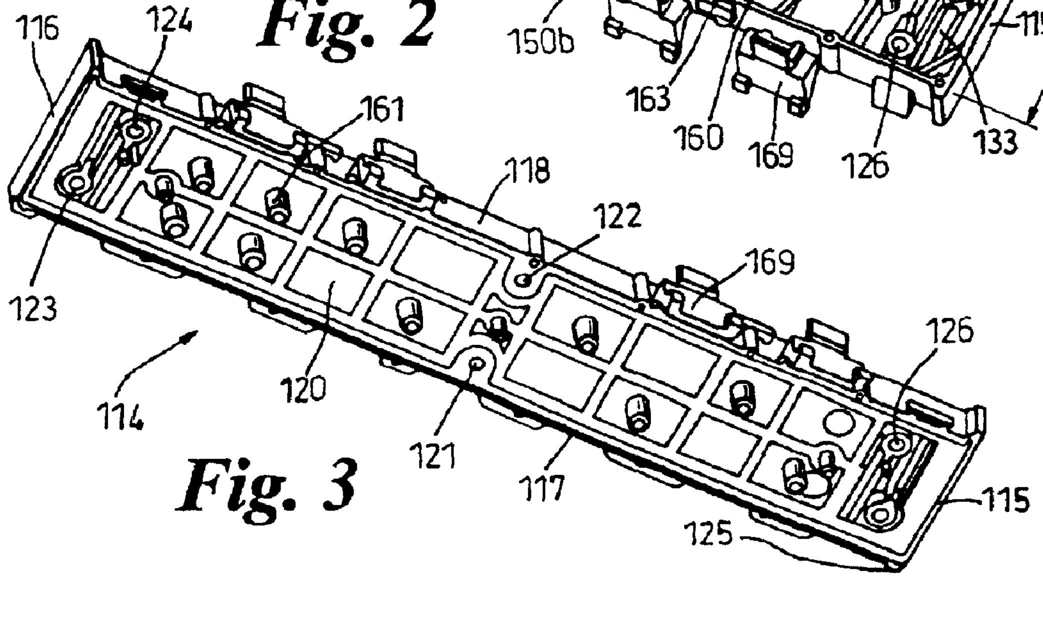
Figure 4:
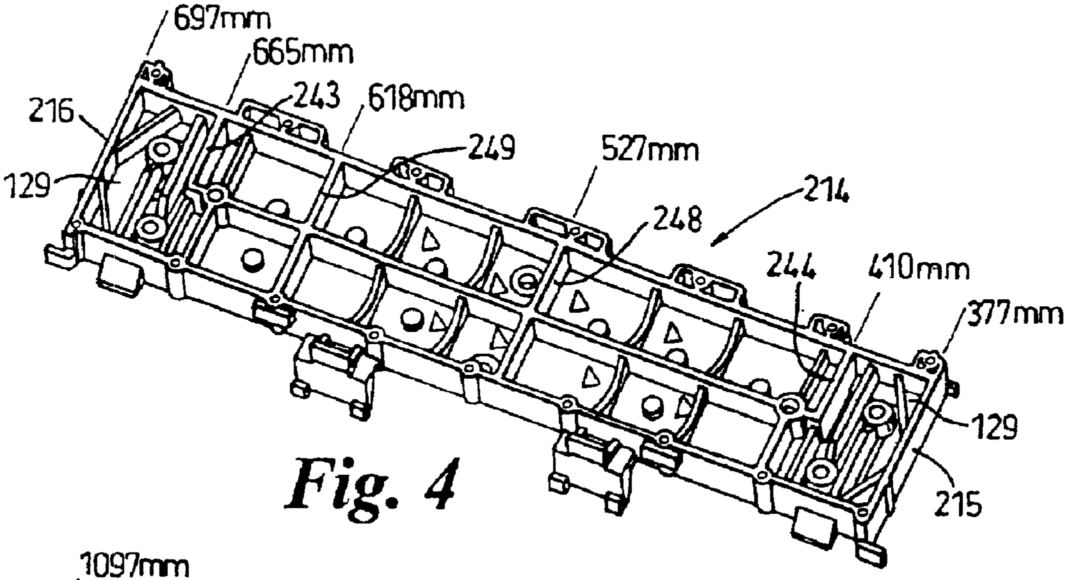
FIGS. 4 and 5 are top perspective views of two further sub-components of the vacuum chamber unit of the first embodiment.
Figure 5:
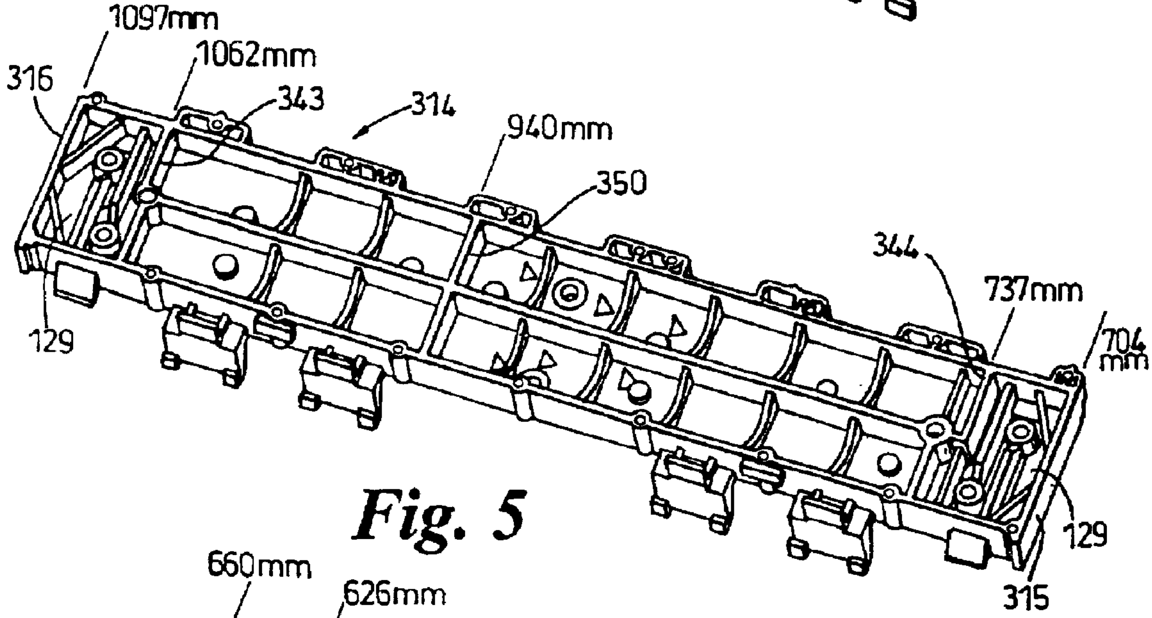

FIGS. 2 to 5 show three separate sub-components 114, 214 and 314 which are positioned end to end along a vacuum beam 80 (not shown in FIGS. 2 to 5) to constitute a vacuum guide 14. FIGS. 2 to 3 show top and bottom views of a right sub-component 114, FIG. 4 shows a central sub-component 214 and FIG. 5 shows a left sub-component 314. The guide is for use in a 42" (1067 mm) printer.

Sub-component 114 has the general form of an open rectangular box, having end walls 115, 116 and long walls 117, 118. For attachment to the vacuum beam 80, the bottom face 120 of the sub-component 114 is provided with two centrally-arranged fixing holes 121, 122, and with two additional fixing holes 123, 124 and 125, 126 in each of two end from the end regions of walls 117, 118. It will be noted that the end connection regions 129 around the arms 133–136 do not have a bottom face 120. Beneath each of these regions 129, the top of beam 80 is provided with a single 7 mm diameter hole to connect the vacuum guide with the beam.

The end connection regions 129 are separated from the rest of the sub-component by dividing walls 143, 144 parallel to the end walls. The space between walls 143, 144 forms two chambers 150, 151 separated by a further dividing wall 147, and each chamber 150, 151 is itself divided into front and rear chambers, 150*a*, 150*b* and 151*a*, 151*b* respectively, by a longitudinally-extending intermediate wall 153. Internal, generally V-shaped partitions 156 distributed along the sub-component 114 serve to provide stiffness.

Circular openings 160 are provided in the bottom of each chamber which emerge from the underside of the sub-component in the form of tubular members 161. Beneath the sub-component 114, the top of beam 80 is provided with respective holes (not shown) arranged to receive the tubular members 161. Because the members 161 are of plastics material entering holes in a metallic material, and because of irregularities in the surrounding surfaces, there is a danger of unwanted leakage of air around the members 161. Accordingly the lower surface 120 of the sub-component 114 is covered with foamed ethylene-propylene terpolymer sealing material (not shown) to avoid air losses. The thickness and area of application of the foamed sealing material are carefully controlled so that it does not interfere with the accuracy of the subsequent attachment of sub-component 114 to beam 80.

The top edges of long walls 117 and 118 are provided with a plurality of threaded holes 163 for the attachment of a platen 15. A round hole 165 and an elongate hole 166 are provided for an initial locating function of the platen 11. Edge clip members 169 are provided for the subsequent attachment of cover members of the printer.

Sub-component 214 is formed in a similar manner to sub-component 114. It has end walls 215, 216, dividing walls 243, 244 separating off the end connection regions 129, and additional dividing walls 248, 249.

Sub-component 314 is also formed in a similar manner to sub-component 114. It has end walls 315, 316, dividing walls 343, 344 and additional dividing wall 350.

The sub-components are arranged end to end on a single vacuum beam 80 and the numbers in millimetres in FIGS. 2, 4 and 5 indicate the distance from the right hand end of sub-component 14 of all of the end and dividing walls.

Figure 7:
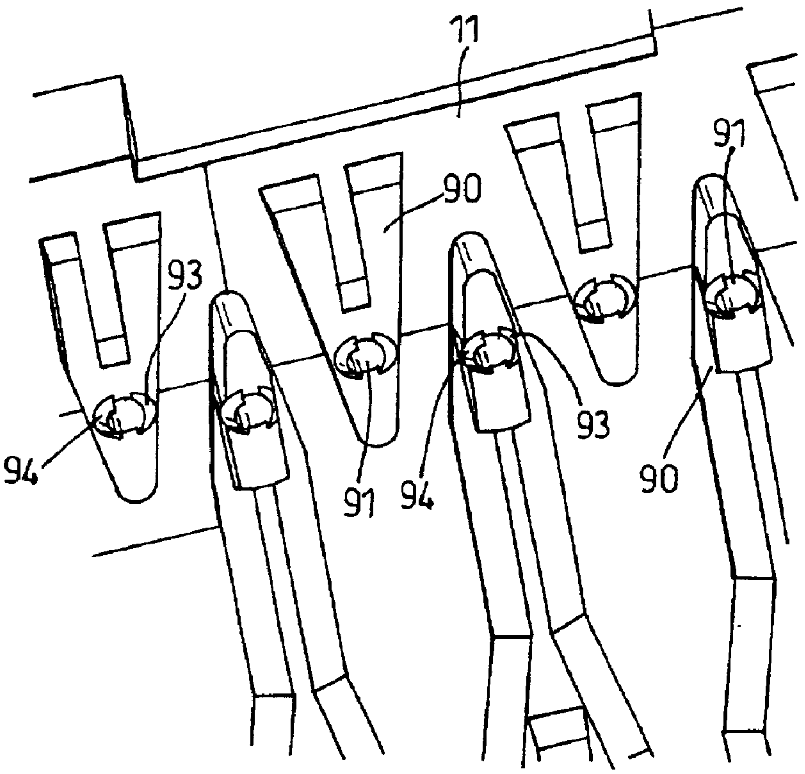
FIG. 7 is a top perspective view of a platen of the device of FIGS. 2 to 5 on an enlarged scale.
Figure 8:
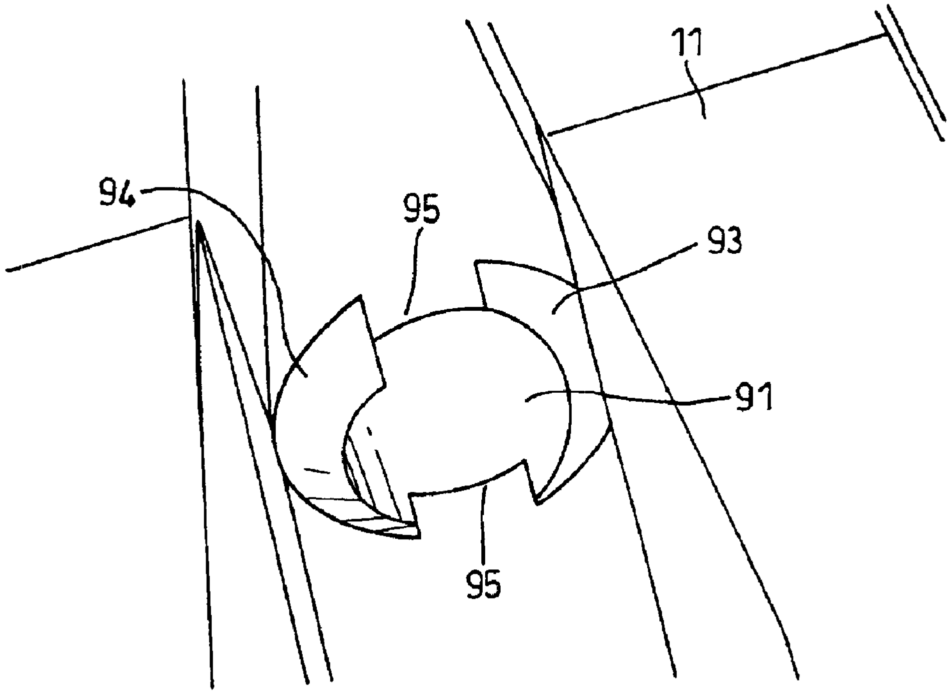
FIG. 8 is a further enlarged view of part of FIG. 7.

FIG. 7 shows an enlarged view of part of the top surface of platen 11. As is known from EP-A-0997308, to keep the print media flat, there are provided print area vacuum channels or depressions 90 in the surface of the platen leading into holes 91 in communication with the vacuum chambers 150, 151. However, instead of being symmetrical as in the prior art, the section of the holes 91 through the platen 11 is asymmetrical. Thus the top edge 92 of each hole includes a relatively steeply-sloping portion 93 and a less steeply sloping portion 94. The two portions 93, 94 are separated by ribs 95.

The holddown device is assembled by attaching each sub-component 114, 214, 314 to the top surface of the sheet metal vacuum beam 80 by six screws each. In sub-component 114, for example the screws pass through holes 121–126. The top surfaces of all the walls of the sub-component are then machined precisely flat, so that they provide an accurate reference for the platen 11. This removes the effects of any distortions introduced in the plastics part 114 during attachment to the vacuum beam.

The platen 11 is then initially attached to the top machined surfaces of the vacuum guide sub-components by two snap fit attachments each. The platen is then fixed to the sub-components by inserting screws into holes 163, starting at one end of the platen and tightening them sequentially along the length of the platen to avoid flatness problems.

In use, a media 12 is inserted with one edge substantially at the right hand edge of the platen 11. In practice, in the embodiment shown, the guide for the edge of the media 12 is 14.375 mm to the left of the 0 mm indication in FIG. 2. For media of several conventional widths, the other edge will be substantially aligned with or adjacent to one of the dividing walls.

Figure 6:
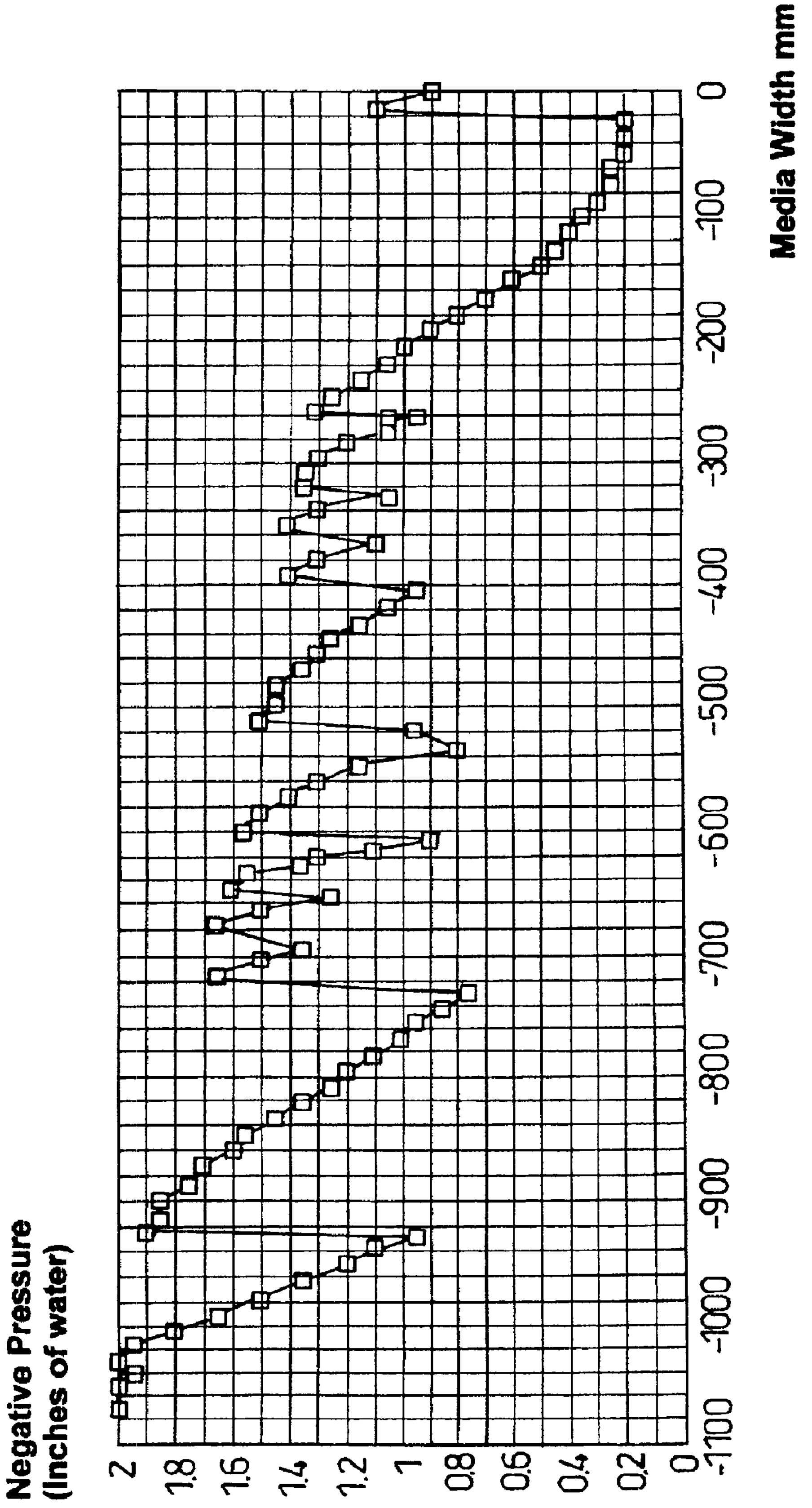
FIG. 6 is a graph indicating the negative pressure applied to the edge area of a media positioned on the media holddown device, against the width of the media.

The location of the dividing walls is such that for conventional media widths greater than, or equal to, 24 inches (610 mm) the negative pressure is equivalent to at least 1.75 inches (44.5 mm) of water. Such widths are 42 inches (1067 mm), 36 inches (914 mm) and 24 inches (610 mm). For conventional media widths less than 24 inches (610 mm), such as A3 (297 mm) and A4 (210 mm) the negative pressure is equivalent to at least 1.45 inches (35.6 mm) of water. For other media widths, which are used infrequently, the negative pressure is equivalent to at least 1 inch (25.4 mm) of water. This is indicated in FIG. 6 which shows a graph of the negative pressure applied to the other edge region (i.e. the left hand edge in FIGS. 1 to 5) as a function of the media width. It will be noted that as the media width decreases, there is a significant improvement on each occasion that its left hand edge coincides with a dividing wall of the vacuum guide.

It will be appreciated that the negative pressure shown in FIG. 6 is applied to the region of the media extending between its edge and the next chamber-dividing wall towards the right in FIGS. 1 to 5. In all cases the pressure applied to the remainder of the media (i.e. between said chamber-dividing wall and the right hand edge) is at a high, substantially-uniform pressure equal to the maximum of the curve corresponding to the next dividing wall to the right.

It will be noted that there are narrow ranges of unusual media widths for which the above criterion for negative pressure is not strictly met. In practice, this is not important because, by definition, such media widths are rarely used and the drop in performance is insignificant, except below approximately 200 mm and such low media widths would not be used in practice with this type of printer. It will also be noted that the distance between the walls towards the left of the row of vacuum chambers is greater than for those nearer the centre of the row. This is because the corresponding pressures at the maxima towards the left of FIG. 6 are relatively high so that there is a considerable distance along the horizontal axis before an unacceptably low pressure occurs.

Specifically, the correspondence between the position of the walls and the commonly-employed media widths is as follows:

| Media Width | Media Width in mm | Wall Position in mm |
|---|---|---|
| 42" | 1067 | 1062 |
| 36" | 914 | 940 |
| A0 | 841 | none |
| 24" | 610 | 618 |
| A1 | 594 | 618 |
| B2 | 500 | 527 |
| A2 | 420 | 410 |
| A3 | 297 | 272 |
| A4 | 210 | none |

It will be noted that no wall is provided for certain media widths. This is because these values correspond to positions on the curve of FIG. 6 at which the pressure lies above the required minimum, e.g. 1.4 inches (35.6 mm) for A0 and 1 inch (25.4 mm) for A4 and media of smaller widths. The edge of A3 media lies over the chamber between 272 mm and 337 mm. This chamber is small because several standard media widths lie in or close to this range and this serves to prevent the applied pressure from falling too low.

The number, size and pattern (i.e. locations) of openings 160 into the vacuum beam 80, taking into account the holes (not shown) under the end connection regions 129, are selected to give the desired suction effect for all media widths. In particular the size of the opening 160[1] arranged to be located underneath and adjacent to the left hand edge of an A3 sheet may be of a larger size, since the chamber 150*b* having this opening is covered by most media sizes. One or more openings to the right of this opening 1601 may also be of a larger size.

The number, size and pattern of openings 160 are also relevant in determining the handling characteristics of the leading and trailing edges of media 12 travelling over platen 11 in the direction of media advance indicated by arrow M. In the absence of intermediate wall 153, the holddown device would not exert a full suction effect on the media 12 with it extended across nearly the entire width W of the vacuum guide, i.e. over all the holes in the platen 11. In view of the presence of wall 153, the holddown device has a substantial effect at a much earlier stage, and the amount of this effect for the leading edge can be controlled by appropriate selection of the number, size and pattern of the openings 160.

The above described arrangement has numerous advantages. For example, the assembly of the holddown device as two separate components, viz the sheet metal vacuum beam and the plastics vacuum guide, is cheaper than the aluminium extrusion of the HP Design Jet 1000 printer. The use of moulded plastics material also permits the provision of numerous other features, e.g. to control the air flow or to provide moulded screw holes for fixing the platen. The use of the same plastics material for the vacuum guide 14, 114, 214, 314 and for the platen 11 avoids differential expansion problems when the temperature changes; thus the platen remains flat and no deterioration in print quality is caused.

The use of two separate components also enables the air flow to be carefully controlled, particularly in small or medium format devices, e.g. up to 42" (1067 mm) in width.

The provision of dividing walls 147 etc. along the vacuum guide 14 ensures the maintenance of a satisfactory negative pressure for all media widths. This is ensured even with a higher number of holes in platen 11 than in prior art printers, the higher number of holes having the advantage that a more uniform pressure may be applied along the length of the platen.

By making the air flow more efficient a smaller fan can be used, thus saving cost and reducing noise. In addition the position of fan box 82 along the beam can be selected as desired, and two or more fans can be used whether in parallel or in series.

The provision of partitions 156 serves to maintain the shape of the sub-components 114, 214, 314 especially while their top surfaces are being machined.

An advantage of using asymmetrical holes 91 is that the noise level does not increase when the media does not cover all the platen. At the same time, small hole sections can be retained to maintain a low air flow and a uniform vacuum can be provided below the media.

Various modifications may be made to the above described arrangement. For example, the dividing walls 147 etc. may extend from wall 117 to 118 or from one of these walls as far as intermediate wall 153, see for example dividing wall 143. In another modification, there are no internal dividing walls such as 147, so that there is only one vacuum chamber on each side of wall 153. Alternatively, if not required, intermediate wall 153 may be omitted. In a further modification more than one intermediate wall may be provided, so that there are three or more rows of chambers.

The platen 11 may be provided in one or more parts, and the lengths of the parts may correspond to the lengths of the sub-components 114, 214, 314.

The beam 80 can be located wholly or partly to the side of the vacuum guide 14, and the locations of opening 160 are altered as appropriate.

The vacuum guide 14 may comprise a single component. Alternatively it may comprise two, or four or more, sub-components extending end to end along the vacuum beam 80.

The asymmetry of holes 91 may extend partly or wholly along their length. Also, the nature of the symmetry may differ from hole to hole, and indeed some of the holes may have a conventional symmetrical cross-section, especially those adjacent to the right hand end of the holddown device which are usually covered by media.

Figure 9:
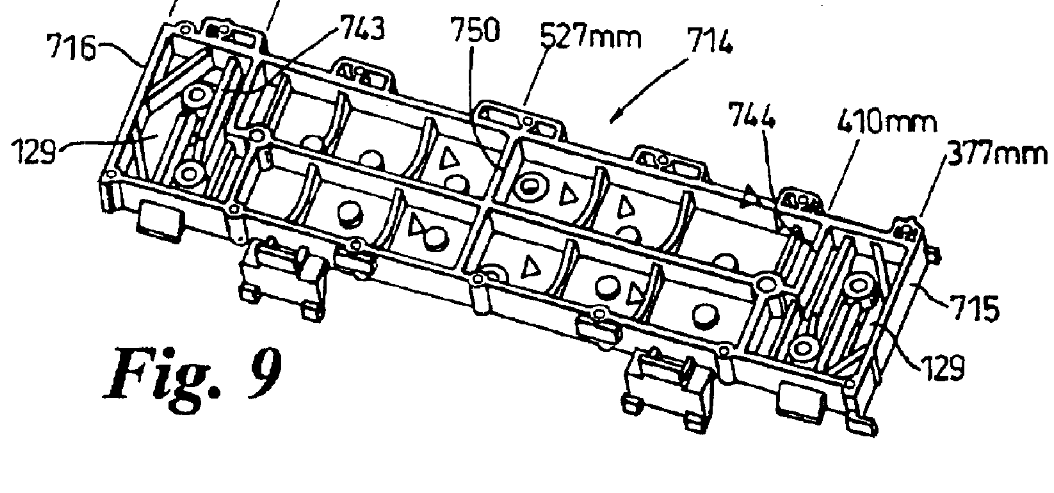
FIG. 9 is a top perspective view of a second sub-component of a vacuum chamber unit of a media holddown device in accordance with a second embodiment of the present invention, the first sub-component of which is identical to that shown in FIG. 1.

FIG. 9 shows the left hand sub-component 714 of a two-part vacuum guide of which the right hand sub-component is identical to that shown in FIGS. 2 and 3. This is for use in a 24 inch (610 mm) printer. Again the figures in millimetres give the distance of the end walls 715, 716 and the dividing walls 743, 744 and 750 from the right hand end of sub-component 114. In other respects, sub-component 714 is manufactured and attached in a similar manner to sub-components 114, 214 and 314.

The use of a single moulded part 114 for two models in a range of printers has the advantage of economies of scale.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A media holddown device comprising:

a platen;

a plurality of vacuum chambers for applying a negative pressure to a media positioned on the platen;

a vacuum source in permanent air communication with holes in the platen through the vacuum chambers;

a hollow vacuum conduit connected to the vacuum chambers;

wherein the vacuum source is connected to the hollow vacuum conduit, the vacuum chambers are part of a first component, the hollow vacuum conduit is part of a second, separate component, and the first component is of a different material from the second component.

2. A media holddown device comprising:

a platen;

a plurality of vacuum chambers for applying a negative pressure to a media positioned on the platen;

a vacuum source in permanent air communication with holes in the platen through the vacuum chambers;

a hollow vacuum conduit connected to the vacuum chambers;

wherein the vacuum source is connected to the hollow vacuum conduit, the vacuum chambers are part of a first component, the hollow vacuum conduit is part of a second, separate component, and the first component is of plastics material and the second component is of sheet metal.

3. A media holddown device comprising:

a platen;

a plurality of vacuum chambers for applying a negative pressure to a media positioned on the platen;

a vacuum source in permanent air communication with holes in the platen through the vacuum chambers;

a hollow vacuum conduit connected to the vacuum chambers;

wherein the vacuum source is connected to the hollow vacuum conduit, the vacuum chambers are part of a first component, the hollow vacuum conduit is part of a second, separate component, and the first component comprises a plurality of sub components arranged along a single second component.

4. A media holddown device comprising:

a platen; and a plurality of vacuum chambers for applying a negative pressure to a media configured to advance across the platen and for maintaining permanent air communication between holes in the platen and a vacuum source, wherein for at least part of the length of the platen, said vacuum chambers are arranged one behind the other in the direction of media advance and are connected to the vacuum source through a hollow vacuum conduit.

5. A device according to claim 4, wherein the vacuum chambers are arranged in rows perpendicular to the direction of media advance.

6. A device according to claim 5, wherein each vacuum chamber has one or more openings communicating with the hollow vacuum conduit and the number, size and/or pattern of arrangement of the vacuum chamber openings differ between rows of the vacuum chambers.

7. A media holddown device comprising:

a platen; and a plurality of vacuum chambers for applying a negative pressure to a media positioned on the platen with respective walls separating adjacent pairs of vacuum chambers along the platen, the vacuum chambers having a plurality of openings providing permanent air communication between holes in the platen and a vacuum source, and the vacuum chambers being connected via respective paths arid through a hollow vacuum conduit to the vacuum source that is capable of applying a negative pressure p, wherein said walls are positioned so that, for substantially all widths of media extending from one end of the platen towards the other, the lowest negative pressure applied to the media does not fall below q, where q is smaller than P.

8. A device according to claim 7, wherein for selected widths of media a lowest negative pressure applied to the media does not fall below r, where r lies between q and p.

9. A method of determining where to locate chamber-separating dividing walls between vacuum chambers of a media holddown device, said method comprising:

arranging the vacuum chambers and the dividing walls along a platen in a manner to substantially ensure that a sufficient negative pressure is substantially always applied by a vacuum source to a media positioned on the platen whatever the width of the media;

arranging the dividing walls at a location or adjacent where the negative pressure would otherwise drop below a predetermined value q for a media having a corresponding width;

providing a plurality of openings in the vacuum chambers to maintain a permanent air communication between the platen and the vacuum source;

configuring a component that forms the vacuum chambers, the configuring including integrating a plurality of sub-components having end walls extending along the platen;

wherein each sub-component has an end connection region separated from a remaining portion of the sub-component by an end region dividing wall.

10. A hard copy apparatus comprising:

a media holddown device including a platen and a plurality of vacuum chambers for applying a negative pressure to a media advancing across the platen, the vacuum chambers having a plurality of openings arranged to provide permanent air communication between the platen and a vacuum source, wherein for at least part of the length of the platen, said vacuum chambers are arranged one behind the other in the direction of media advance and are connected to the vacuum source through a hollow vacuum conduit.

* * * * *